United States Patent [19]

Tiktin

[11] 4,253,660
[45] Mar. 3, 1981

[54] WEIGHTED EXERCISE GLOVE

[76] Inventor: Gary Tiktin, Apt. 403W 27500 Bishop Park Dr., W. Willoughby Hills, Ohio 44092

[21] Appl. No.: 50,544

[22] Filed: Jun. 21, 1979

[51] Int. Cl.³ .................. A63B 21/18; A63B 23/00
[52] U.S. Cl. ................................. 272/67; 272/119; 2/160; 2/161 A
[58] Field of Search .......... 2/159, 160, 161 R, 161 A; 272/67, 119; 84/468

[56] References Cited

U.S. PATENT DOCUMENTS

| | | | |
|---|---|---|---|
| 19,814 | 3/1858 | Monestier | 272/67 |
| 461,744 | 10/1891 | Franshawe | 2/160 |
| 1,358,824 | 11/1920 | Burden | 2/161 R |
| 1,670,176 | 5/1928 | Woolery | 2/159 X |
| 3,298,689 | 1/1967 | Santora | 272/67 X |
| 3,408,657 | 11/1968 | Gallagher | 2/159 |
| 3,417,840 | 12/1968 | Farnsworth | 2/160 X |
| 3,635,190 | 1/1972 | Araki | 2/161 R X |
| 3,838,853 | 10/1974 | Fredenhagen | 2/161 R X |

Primary Examiner—George J. Marlo
Attorney, Agent, or Firm—Burge & Porter Co.

[57] ABSTRACT

A glove is provided with means for releasably connecting a weight at selected locations about the outer surface of the glove to facilitate resistance exercising of muscles of the forearm, wrist, hand and/or fingers. The weight is preferably carried on a strap. The connection means preferably includes interfittable parts carried on the glove and on the weight support strap. The glove preferably covers the entire hand of the wearer and may be used in palm-up, palm-down and palm-sideways attitudes with the strap-carried weight attached at any of the selected locations. In a modified form, a finger glove is provided with means for releasably coupling a weight thereto for excercising finger muscles.

10 Claims, 4 Drawing Figures

WEIGHTED EXERCISE GLOVE

BACKGROUND OF THE INVENTION

1. Field of the Invention

The present invention relates generally to an exercise appliance and, more particularly, to a glove having means for releasably connecting a weight at selected locations about the outer surface of the glove to facilitate controlled resistance exercising of the muscles of the forearm, wrist, hand and/or fingers.

2. Prior Art

While gloves of various configurations have been proposed for sporting and/or protective uses, and while some of these gloves have been provided with weights to facilitate their proper use in certain sporting applications, gloves have not previously been utilized as a part of a controlled resistance exercise system.

While proposals of various types have been made in efforts to provide controlled resistance exercise systems for muscles of the forearm, wrist, hand and/or fingers, such proposals have not provided a capability to selectively apply resistance forces at precisely selected positions along the hand and/or fingers. Prior proposals have not provided a simple and inexpensive, yet highly versatile system for the controlled resistance exercising of muscles of the forearm, wrist, hand and/or fingers.

Neither have prior proposals provided an exercise appliance including a finger glove with a releasably attachable weight for exercising finger muscles.

SUMMARY OF THE INVENTION

The present invention overcomes the foregoing and other drawbacks of prior art proposals by providing an exercise appliance including a glove and a weight which is releasably attachable to the glove at selected locations about the outer surface of the glove to facilitate resistance exercising of muscles of the forearm, wrist, hand and/or fingers.

In accordance with the preferred practice of the present invention, an exercise appliance includes essentially three components, namely a glove, a weight, and a connection means for selectively coupling the weight to the glove at a plurality of selected locations about the outer surface of the glove. The weight is preferably carried on a strap, whereby the glove may be oriented at any of a wide variety of attitudes relative to the strap-carried weight to permit a full range of controlled resistance exercise forces to be used in developing muscles of the forearm, wrist, hand and/or fingers.

The glove preferably covers the entire hand of the wearer, and may be provided with a wrist-encircling strap or other wrist-engaging formation for securely holding the glove in position during use. In preferred practice, both left and right hand gloves are provided, as are strap-carried weights of various sizes.

In a less preferred form the glove may cover only a finger of the wearer. Where a finger glove embodiment is provided, the glove is preferably provided with a finger-gripping means for retaining the glove in position during use.

The connection system utilized to releasably couple the weight to the glove preferably takes the form of interfitting parts carried on the glove and on the weight. One or more connection formations or parts are provided at selected locations about or across the outer surface of the glove. A matable connection formation or part is carried by the weight or by the weight-supporting strap so that the weight can be coupled to the glove at any one of the selected locations.

As will be apparent from the foregoing summary, a general feature of the present invention lies in the provision of an exercise appliance including a glove and a weight which is connectible to the glove at any of a plurality of selected locations to facilitate resistance exercising of muscles of the forearm, wrist, hand and/or fingers.

These and other features and a fuller understanding of the invention may be had by referring to the following detailed description and claims taken in conjunction with the accompanying drawings.

DESCRIPTION OF THE PREFERRED EMBODIMENT

Figure 1:
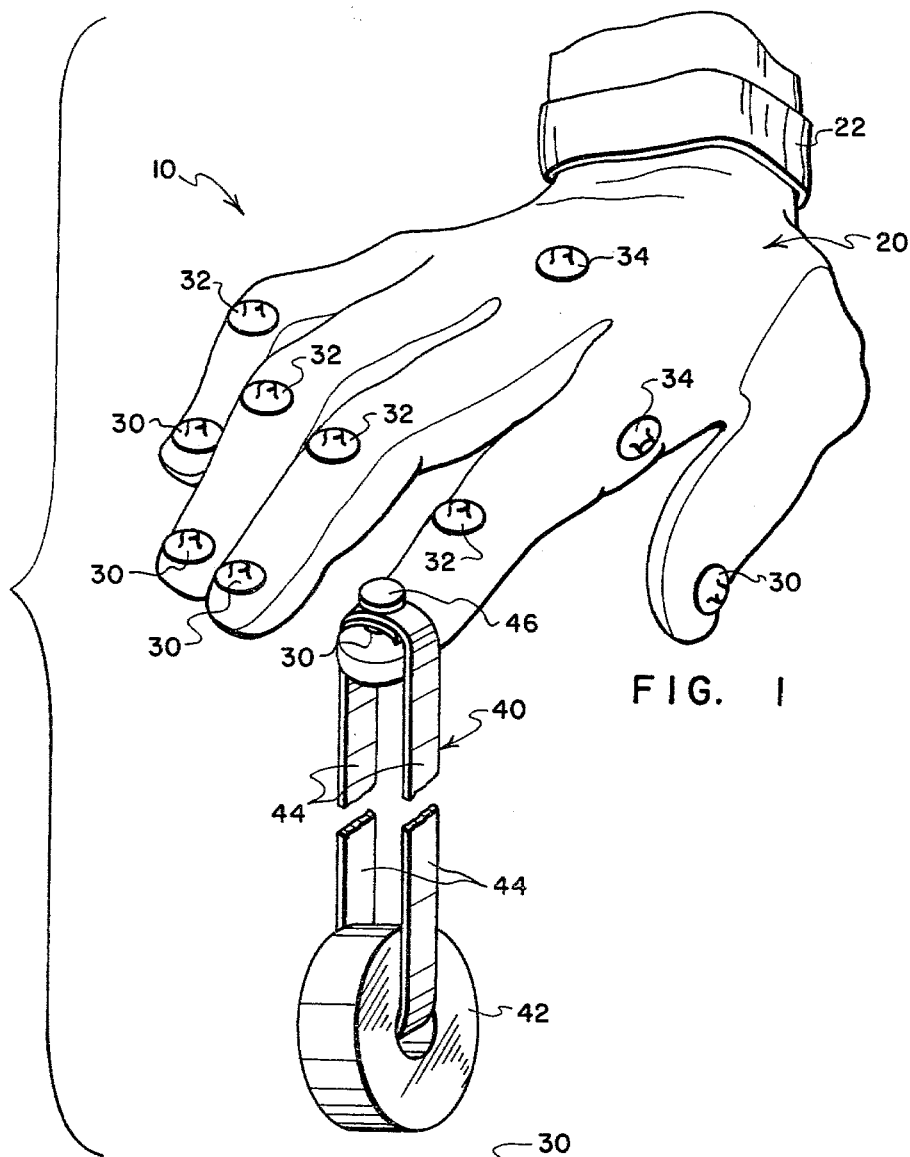
FIG. 1 is a perspective view of one embodiment of an exercise appliance incorporating features of the present invention, the appliance including a glove shown in place on a person's hand, and including a strap-carried weight shown supported toward the end of one finger portion of the glove, the strap being foreshortened.
Figure 2:
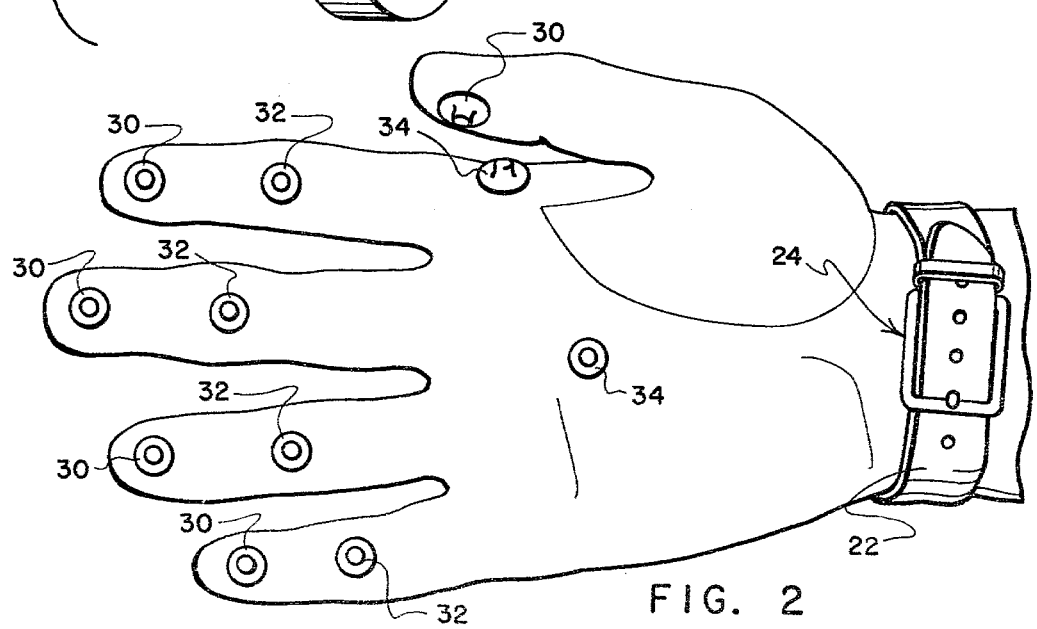
FIG. 2 is a bottom plan view of the glove of FIG. 1.

Referring to FIGS. 1 and 2, an exercise appliance incorporating features of the present invention is indicated generally by the numeral 10. The appliance 10 includes a glove, indicated generally by the numeral 20, and a strap-carried weight, indicated generally by the numeral 40.

The glove 20 is formed from leather or other suitable material which enables it to conform quite closely to the shape of the hand of the wearer and to retain that shape despite the application of forces to various portions of its outer surface. The glove 20 includes a wrist strap 22 which encircles the wrist of the wearer. The strap 22 carries a buckle 24 for securing the strap 22 snugly about the wrist of the wearer to hold the glove 20 in place during use. While a right hand glove has been shown in the drawing, it will be understood that in the preferred practice of the present invention, both left and right hand gloves are provided to facilitate exercising the muscles of both hands.

Snap-type fasteners, indicated generally by the numerals 30, 32, 34, are provided at various locations on the outer surface of the glove 20 where resistance forces can effectively be applied to facilitate a program of controlled resistance exercising of the muscles of forearm, wrist, hand and/or fingers. The snap fasteners 30 are located on both upper and lower surfaces of the glove 20 near the tips of the fingers and thumb of the glove 20. The snap fasteners 32 are located on both upper and lower surfaces of the glove 20 at locations approximately midway along the lengths of the fingers of the glove 20. The snap fasteners 34 are located on both the upper and lower surfaces of palm portions of the glove 20. Still other fasteners (not shown) may also be provided at selected locations about the outer surface of the glove 20.

The weight 40 preferably includes a relatively heavy body 42 supported by a strap 44. A connector 46 is carried by the strap 44 for selectively engaging any of the fasteners 30, 32, 34 to releasably connect the weight 40 with the glove 20.

The strap 44 is preferably formed from leather or other suitable material enabling it to support the body 42. The connector 46 and the fasteners 30, 32, 34 are of any of a variety of commercially available types which will snap-together and release to provide a means for releasably coupling the weight 40 to selected parts of the glove 20.

The body 42 preferably comprises a commercially available weight of appropriate mass for providing proper resistance exercise forces for a progressive program to improve muscle strength and tone. Weight size can be increased as muscle strength is enhanced. In preferred practice, a number of strap-carried weights 40 of various sizes are used with the glove 20 inasmuch as different muscles have different resistance force exercise capabilities.

Figures 3, 4:
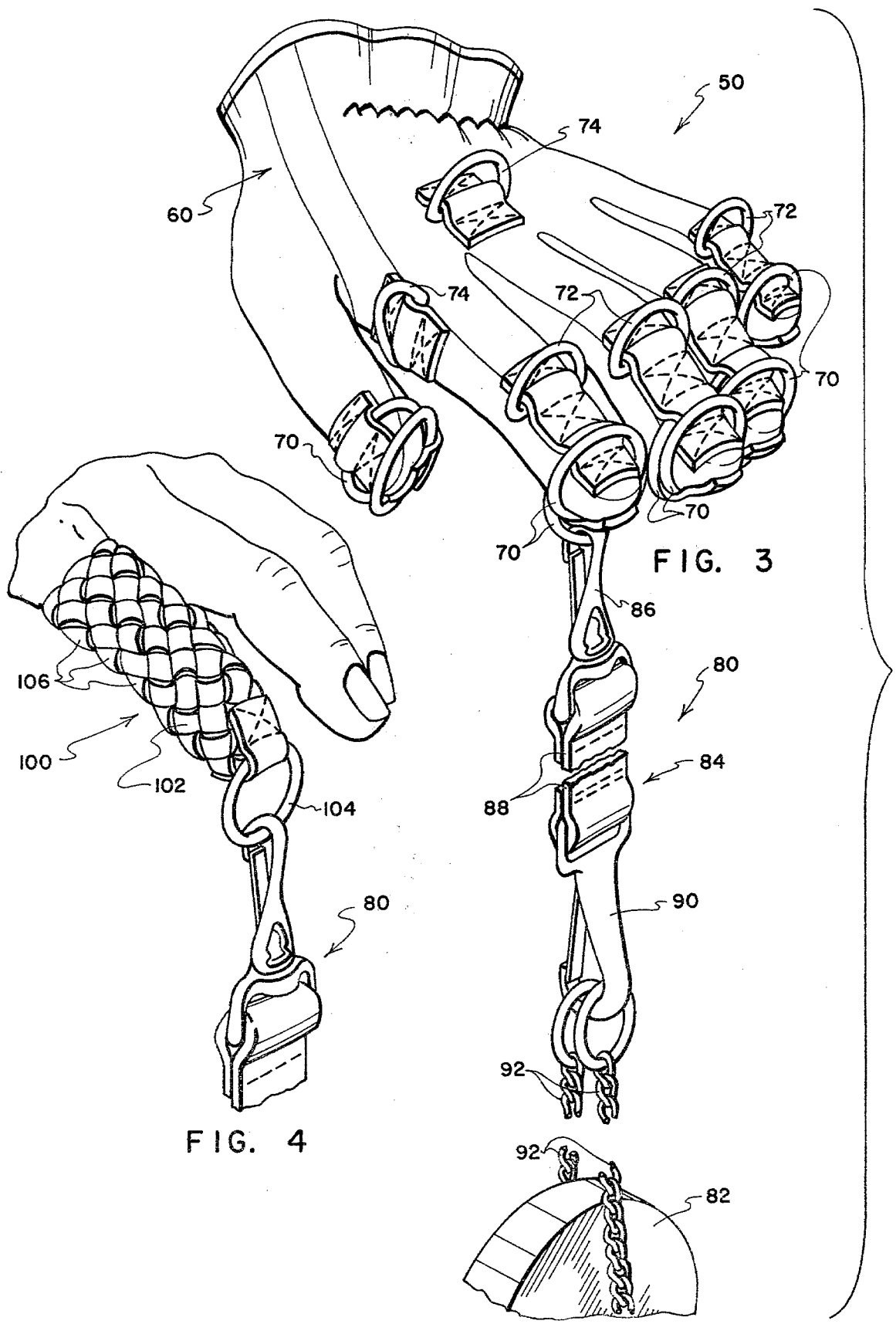
FIG. 3 is a perspective view of an exercise appliance embodying the preferred practice of the present invention.
FIG. 4 is a perspective view of a finger glove incorporating features of the present invention.

Referring to FIG. 3, an exercise appliance embodying the preferred practice of the present invention is indicated generally by the numeral 50. The appliance 50 includes a glove, indicated generally by the numeral 60, and a strap-carried weight, indicated generally by the numeral 80.

The glove 60 is formed from leather or other suitable material which enables it to conform quite closely to the shape of the hand of the wearer and to retain that shape despite the application of forces to various portions of its outer surface. While a right hand glove has been shown in the drawing, it will be understood that in the preferred practice of the present invention, both left and right hand gloves are provided to facilitate exercising the muscles of both hands.

Ring-type fasteners, indicated generally by the numerals 70, 72, 74, are provided at various locations on the outer surface of the glove 60 where resistance forces can effectively be applied to facilitate a program of controlled resistance exercising of the muscles of the forearm, wrist, hand and/or fingers. The ring fasteners 70 are located on both upper and lower surfaces of the glove 60 near the tips of the fingers and thumb of the glove 60. The ring fasteners 72 are located on upper surfaces of the glove 60 at locations approximately midway along the lengths of the fingers of the glove 60. The ring fasteners 74 are located on both the upper, lower and side surfaces of palm portions of the glove 60. Still other ring-type fasteners (not shown) may also be provided at selected locations about the outer surface of the glove 60.

The weight 80 preferably includes a relatively heavy body 82 supported by a strap assembly 84. A finger-operable connector 86 is carried by the strap assembly 74 for selectively engaging any of the ring fasteners 70, 72, 74 to releasably connect the weight 80 with the glove 60.

The strap assembly 84 preferably has a central section 88 formed from leather or other suitable material enabling it to support the body 82. The central section 88 interconnects the finger-operable connector 86 with a similar connector 90. A chain 92 extends through the body 82 and has its opposite ends coupled to the connector 90.

The body 82 preferably comprises a commercially available weight of appropriate mass for providing proper resistance exercise forces for a progressive program to improve muscle strength and tone. Weight size can be increased as muscle strength is enhanced. In preferred practice, a number of weight bodies 82 of various sizes are used with the glove 60 inasmuch as different muscles have different resistance force exercise capabilities.

Referring to FIG. 4, still another form of exercise appliance embodying features of the present invention is indicated generally by the numeral 100. The appliance 100 includes a finger glove 102 which carries a ring-type connector 104 near its tip for connection to a strap carried weight such as the weights 40, 80.

The glove 100 is formed from leather or other suitable material which enables it to conform quite closely to the shape of the finger of the wearer and to retain that shape despite the application of forces to the glove through the ring connector 104.

Where a finger-type glove is employed, it is preferably provided with a suitable finger gripping means for retaining the glove in place during use. The glove 100 has been shown as having a body formed from a loosely woven array of straps 106 which constrict about the finger of the wearer under the influence of the application of tension forces to the ring connector 104 to hold the glove 100 in place on the finger of the wearer. Other forms of finger gripping devices may also be used as will be apparent to those skilled in the art.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. An exercise appliance including a glove, a weight, fastener means connected to the weight, and connection means provided at a plurality of selected locations on the glove, the connection means being cooperable with the fastener means for releasably coupling the weight to the glove at the selected location, the weight including a strap and a body supported on the strap, the fastener means being connected to the strap at a location spaced from the body.

2. The exercise appliance of claim 1 wherein the glove additionally includes wrist-engagable means carried by the glove for engaging the wrist of the wearer to retain the glove in place on the wearer's hand.

3. The exercise appliance of claim 1 wherein the glove is configured to cover the finger of a wearer, and additionally includes means for retaining the glove in place on the wearer's finger.

4. The exercise appliance of claim 1 wherein the connection means includes a ring-like connector member located near the fingertip portion of the glove, the connector member being cooperable with the fastener means for releasably coupling the weight to the glove.

5. The exercise appliance of claim 1 wherein the connection means includes a ring-like connector member located near a midpoint along the length of a finger portion of the glove, the connector member being cooperable with the fastener means for releasably coupling the weight to the glove.

6. The exercise appliance of claim 1 wherein the connection means includes a ring-like connector member located on a palm portion of the glove, the connector member being cooperable with the fastener means for releasably coupling the weight to the glove.

7. The exercise appliance of claim 1 wherein the connection means includes a ring-like connector member located on a side portion of the glove which extends along the back of the hand of a wearer of the glove, the connector member being cooperable with the fastener means for releasably coupling the weight to the glove.

8. The exercise appliance of claim 1 wherein the connection means includes a ring-like connector member located on a side portion of the glove which extends along the inside palm surface of the hand of a wearer of the glove, the connector member being cooperable with the fastener means for releasably coupling the weight to the glove.

9. An exercise appliance including:

(a) a glove formed from material which conforms closely to the shape of the hand of a wearer;
(b) connection means including a plurality of ring-like connector formations on the glove at selected positions about the outer surface of the glove;
(c) a weight;
(d) fastener means connected to the weight and being engageable, one at a time, with the connector formations for releasably coupling the weight to the glove at the selected positions; and,
(e) the weight includes a strap and a body supported on the strap, and the fastener means is carried on the strap at a location spaced from the body.

10. The exercise appliance of claim 9 additionally including wrist engaging means carried by the glove for engaging the wrist of a wearer to retain the glove in place on the wearer's hand.

* * * * *